Dec. 4, 1928.
M. W. McCOY
1,694,076
JACK FOR SELF PROPELLING VEHICLES
Filed July 2, 1926
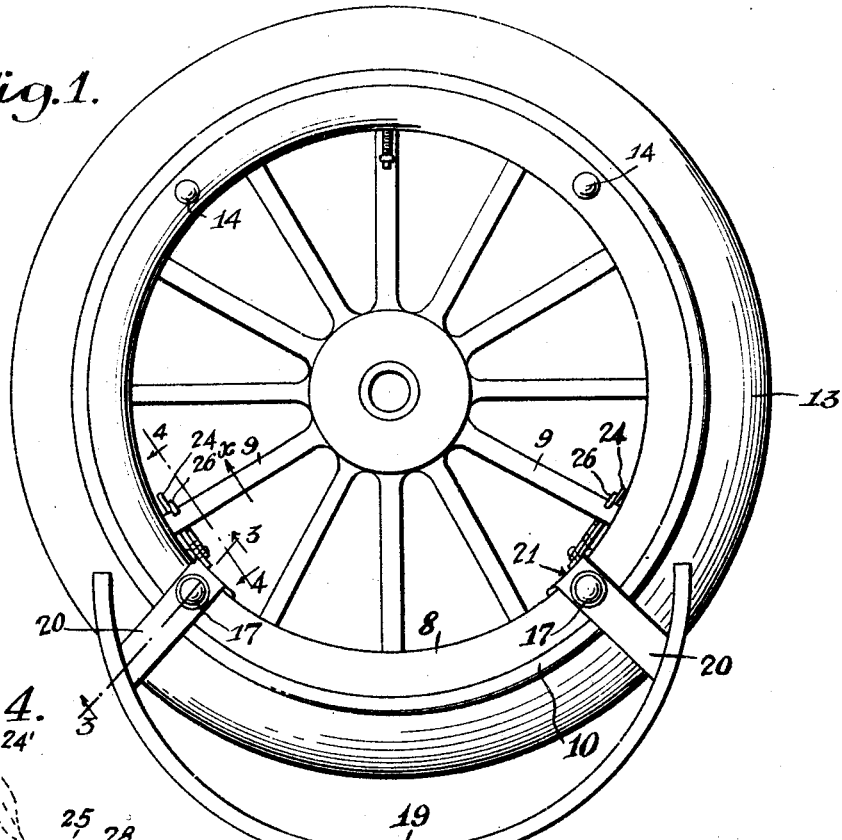
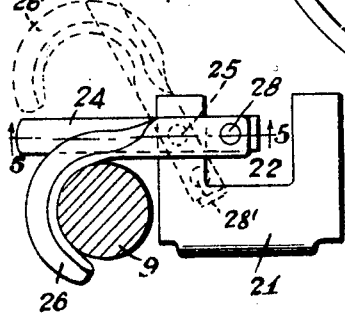
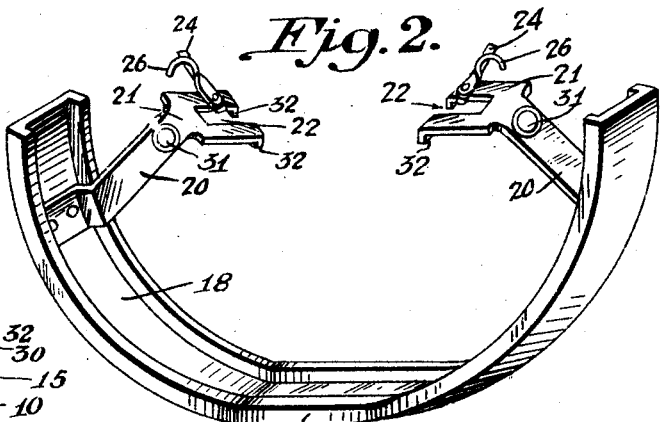
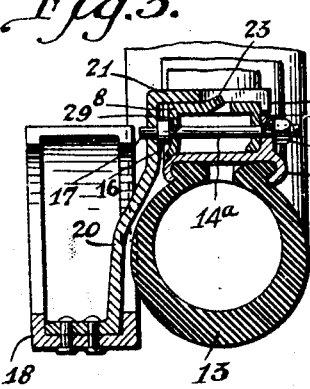
Inventor:
Melvin W. McCoy,
by his Atty N. DuBois.

Patented Dec. 4, 1928.

1,694,076

UNITED STATES PATENT OFFICE.

MELVIN W. McCOY, OF SPRINGFIELD, ILLINOIS.

JACK FOR SELF-PROPELLING VEHICLES.

Application filed July 2, 1926. Serial No. 120,048.

The invention relates to jacks of the type which are attachable to a wheel of the vehicle and act to lift the wheel upon forward or rearward movement of the vehicle.

The purposes of the invention are: to provide an improved segmental tread-member, easily and quickly attachable to and removable from the wheel, dependable in use and adapted for convenient stowage in the vehicle when not in use; to provide improved means for attaching the tread-member to the wheel, consisting of special bolts fitting in the usual holes in the rim of the wheel, without the use of tools; to provide improved means for securing the attached tread-member on the wheel; to provide an accurate tread-element having its central part flattened to form a flat base to safely support the lifted vehicle wheel and to prevent the tread element from slipping away from the wheel; to provide special attaching bolts adapted to secure the tread-element in proper relation to the wheel; to provide hooks adapted to engage on spokes of the wheel to prevent rotation of the jack relative to the wheel to which is attached; and to provide other new and useful structural details, as will hereinafter appear.

With these purposes in view, my invention consists in the new and useful structure, shown in the accompanying drawings and now to be described and finally recited in the claims.

Figure 1 is a side elevation of the jack shown in connection with an automobile wheel; Fig. 2 is a perspective view of the detached tread-member and appurtenances; Fig. 3 is an enlarged transverse section taken in the plane of the line 3—3 of Fig. 1; Fig. 4 is a sectional view taken on the line 4—4 of Fig. 1 looking outwardly and Fig. 5 is a vertical transverse section taken on the line 5—5 of Fig. 4.

The same reference numerals designate the same parts in the several views.

The jack is shown connected with a merely typical automobile wheel. The wheel proper is not a part of the present invention, I will therefore show and describe only such parts of the wheel as are necessary to illustrate the connection and co-operation of the jack with the wheel.

For convenience in description the side of the wheel next to the vehicle body will be called the near side of the wheel; and the opposite side of the wheel will be called the remote side. The jack is shown attached on the near side of the wheel.

The wheel shown comprises, among other things, a felloe 8, spokes 9, a tire rim 10, a tire 13, standard bolts 14 and special bolts 14$^a$ connecting the metal flanges of the tire rim 10 with the felloe 8, and nuts 15 securing the bolts 14 and 14$^a$.

The main structure of the jack is preferably of steel of suitable dimensions formed as shown, to give the jack sufficient rigidity and strength without unduly increasing its weight.

The jack proper comprises a trough-shape arch-like tread-member 18 having a flat central part 19 which rests on the ground when the jack is in use and affords a sufficient base to support the lifted wheel safely.

Brackets 20 are shaped to conform to the felloe 8 and to lie close to the near side of the tire 13. Both brackets are alike, except that one is right and the other is left, so a description of one will suffice for both. The left-hand bracket 20 is preferably a steel casting of the form shown and has an approximately horizontal table-member 21 adapted to extend across the felloe 8 and having a central opening 22 adapted to accommodate a protuberance 23, found on some wheels, in order to permit the placing of the bracket in such relation to an adjacent spoke 9 that the aligned holes 29 in the felloe 8 and the holes 30 in the flange of the tire rim 10 may receive either standard bolts 14 or special bolts 14$^a$ as the case may be.

The table-member 21 has integral terminal flanges 32 engaging the outer edge of the felloe 8 to prevent the bracket from slipping off the stud 17.

A lever 24 (Fig. 4) is connected with one branch of the table 21 by a fixed pivot 25. A hook 26 adapted to engage a wheel spoke 9 adjacent to the table, is connected with the shorter member of the lever 24 by a pivot 28. When the parts are assembled as shown in Fig. 4, clockwise rotation of the wheel, as indicated by the dart X (Fig. 1), will cause the spoke 9 to push in a straight line on the hook 26 so that there will not be any tendency either to rotate the lever on its pivot 25, or to rotate the hook on its pivot 28; and the hook will be effective to prevent movement of the jack relative to the wheel.

The special bolts 14$^a$ (Fig. 3) will preferably be used to connect the brackets with the vehicle wheel. Each bolt 14$^a$ is of suitable length and is adapted to fit in existing holes 29 in the felloe of the wheel, and existing holes 30 in the flanges of the tire rim 10. The bolts 14ª differ from the bolts 14 in that each bolt 14ª has an integral head 16 and an integral projecting stud 17 adapted to enter the hole 31 in any bracket 20 to support the bracket on the wheel.

When the parts are assembled the jack will be supported on the studs 17.

The jack is designed to be used as an accessory for existing automobiles or trucks. The special bolts 14ª will be supplied as part of the equipment. When not in use the jack will be detached and stowed under the seat or in some other convenient place in the vehicle so that it will always be accessible for use in case of emergency.

In attaching the jack to the wheel the brackets will be placed on the studs 17 and when the jack is in place on the wheel the vehicle will be propelled forward or rearward as the case may be, to bring the tread of the jack into contact with the ground, and continued movement of the vehicle will cause the jack to lift the wheel off the ground as shown in Fig. 1.

In order to detach the jack it is only necessary to remove the brackets 20 from the studs 17.

I am aware of the prior use of jacks having tread-members connected with a vehicle wheel and rolling on the ground to lift the wheel upon rotation of the wheel; I therefore do not claim broadly that feature of construction.

What I do claim and desire to secure by Letters Patent is:

1. In conjunction with a vehicle wheel having a detachable metal tire rim; a jack structure comprising an arcuate trough-shape tread-member; upwardly extending inclined brackets secured in the trough of said tread-member and each having a hole to receive the stud of a special bolt; flat tables at the upper ends of the respective brackets, extending across the felloe and across the metal tire rim of the wheel; special stud bolts occupying existing holes in the metal tire rim and supporting said brackets; levers pivoted on the respective tables adjacent to spokes of the wheel; and hooks pivoted on the respective levers and adapted to engage said spokes directly to prevent rotation of the wheel in either direction.

2. In conjunction with a vehicle wheel having spokes and having also projecting studs on the near face of the wheel; a jack comprising a tread-member; right and left brackets secured on said tread-member and having perforations to receive said studs to connect the brackets with said wheel and having hook-supporting means adjacent to spokes of said wheel; and hooks on said hook-supporting means adapted to engage said spokes to prevent rotation of the jack relative to the wheel.

3. In combination with a wheel having spokes, a rubber tire, a metal tire-rim, a metal felloe, and special stud bolts connecting the metal tire-rim with the felloe; a channelled tread-member; a pair of upwardly extending brackets secured in the channel of said tread-member and having holes to receive the studs of said special stud bolts, said brackets having also tables extending across the felloe, and having also members engaging the rim of the felloe to prevent crosswise movement of the tables relative to the felloe; levers pivoted on the respective tables; and hooks pivoted on said levers and adapted to engage directly spokes of the wheel to detachably connect the jack with the wheel.

In witness whereof I have hereunto signed my name at Springfield, Sangamon County, Illinois, this 25th day of June, 1926.

MELVIN W. McCOY.